(12) United States Patent
Martinez Tarradell et al.

(10) Patent No.: US 9,100,160 B2
(45) Date of Patent: Aug. 4, 2015

(54) APPARATUS AND METHOD FOR SMALL DATA TRANSMISSION IN 3GPP-LTE SYSTEMS

(71) Applicant: Intel Corporation, Santa Clara, CA (US)

(72) Inventors: Marta Martinez Tarradell, Hillsboro, OR (US); Sangeetha L. Bangolae, Beaverton, OR (US); Puneet Jain, Hillsboro, OR (US); Varun Rao, Cincinnati, OH (US)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 13/790,630

(22) Filed: Mar. 8, 2013

(65) Prior Publication Data

US 2014/0036795 A1 Feb. 6, 2014

Related U.S. Application Data

(60) Provisional application No. 61/679,627, filed on Aug. 3, 2012.

(51) Int. Cl.
*H04W 4/00* (2009.01)
*H04L 5/00* (2006.01)
(Continued)

(52) U.S. Cl.
CPC .............. *H04L 5/0057* (2013.01); *H04L 5/00* (2013.01); *H04L 41/0836* (2013.01); *H04L 43/0811* (2013.01); *H04L 65/4092* (2013.01); *H04L 65/80* (2013.01); *H04L 67/16* (2013.01); *H04L 67/303* (2013.01); *H04N 21/23439* (2013.01); *H04N 21/25825* (2013.01); *H04W 4/00* (2013.01); *H04W 24/02* (2013.01); *H04W 24/04* (2013.01); *H04W 28/0236* (2013.01); *H04W 40/02* (2013.01); *H04W 40/34* (2013.01);
(Continued)

(58) Field of Classification Search
None
See application file for complete search history.

(56) References Cited

U.S. PATENT DOCUMENTS

2002/0045428 A1  4/2002  Chesson
2004/0170217 A1  9/2004  Ho
(Continued)

FOREIGN PATENT DOCUMENTS

CN  103582006 A  2/2014
EP  2509345 A1  10/2012
(Continued)

OTHER PUBLICATIONS

"Evolved Universal Terrestrial Radio Access (E-UTRA); Radio Resource Control (RRC); Protocol specification", 3GPP TS 36.331 V11.2.0. Technical Specification Group Radio Access Network. Release 11., (Dec. 2012), 340 pgs.
(Continued)

*Primary Examiner* — Afshawn Towfighi
(74) *Attorney, Agent, or Firm* — Schwegman Lundberg & Woessner, P.A.

(57) ABSTRACT

In Machine Type Communication (MTC) with a 3GPP Long Term Evolution (LTE) Network, there is often a need to transmit and receive small data payloads. New information elements (IEs) have been defined to ease the transmission and receipt of small data payloads. Methods and systems can use the new IEs to more efficiently transmit and receive data. The new IEs include a Small Data ACK IE and a Small Data Container IE. Other new messages include an RAC Release indicator and an RRC Connection Release.

19 Claims, 3 Drawing Sheets

(51) Int. Cl.

| | |
|---|---|
| H04W 24/04 | (2009.01) |
| H04W 76/02 | (2009.01) |
| H04L 29/06 | (2006.01) |
| H04W 24/02 | (2009.01) |
| H04N 21/2343 | (2011.01) |
| H04N 21/258 | (2011.01) |
| H04W 40/02 | (2009.01) |
| H04L 12/24 | (2006.01) |
| H04L 12/26 | (2006.01) |
| H04L 29/08 | (2006.01) |
| H04W 28/02 | (2009.01) |
| H04W 40/34 | (2009.01) |
| H04W 72/00 | (2009.01) |
| H04W 72/04 | (2009.01) |
| H04W 88/06 | (2009.01) |
| H04W 36/14 | (2009.01) |
| H04W 16/28 | (2009.01) |

(52) U.S. Cl.
CPC ............ *H04W72/005* (2013.01); *H04W 72/04* (2013.01); *H04W 72/042* (2013.01); *H04W 72/044* (2013.01); *H04W 72/0406* (2013.01); *H04W 72/0413* (2013.01); *H04W 76/02* (2013.01); *H04W 76/021* (2013.01); *H04W 76/023* (2013.01); *H04W 76/025* (2013.01); *H04W 76/026* (2013.01); *H04W 88/06* (2013.01); *H04W 16/28* (2013.01); *H04W 36/14* (2013.01); *Y02B 60/50* (2013.01)

(56) References Cited

U.S. PATENT DOCUMENTS

| | | | |
|---|---|---|---|
| 2009/0016232 | A1 | 1/2009 | Kwon et al. |
| 2010/0009675 | A1 | 1/2010 | Wijting et al. |
| 2010/0009690 | A1 | 1/2010 | Jin et al. |
| 2011/0250892 | A1 | 10/2011 | Gupta et al. |
| 2011/0268006 | A1 | 11/2011 | Koskela et al. |
| 2012/0057476 | A1 | 3/2012 | Chan et al. |
| 2012/0106517 | A1 | 5/2012 | Charbit et al. |

FOREIGN PATENT DOCUMENTS

| | | |
|---|---|---|
| KR | 1020110093642 A | 8/2011 |
| KR | 1020120031546 A | 4/2012 |
| KR | 102012007044 A | 6/2012 |
| KR | 1020120071676 A | 7/2012 |
| TW | 201410054 A | 3/2014 |
| WO | WO-2011099821 A2 | 8/2011 |
| WO | WO-2011112051 A2 | 9/2011 |
| WO | WO-2011119680 A2 | 9/2011 |
| WO | WO-2012056209 A1 | 5/2012 |
| WO | WO-2012068731 A1 | 5/2012 |
| WO | WO-2013012759 A1 | 1/2013 |
| WO | WO-2014021987 A1 | 2/2014 |
| WO | WO-2014022776 A1 | 2/2014 |
| WO | WO-2014022797 A1 | 2/2014 |

OTHER PUBLICATIONS

"Evolved Universal Terrestrial Radio Access Network (E-UTRAN); S1 Application Protocol (S1AP)", 3GPP TS 36.413 V11.2.1. Technical Specification Group Radio Access Network. Release 11., (Feb. 2013), 272 pgs.
"International Application Serial No. PCT/US2013/044445, International Search Report mailed Sep. 16, 2013", 3 pgs.
"International Application Serial No. PCT/US2013/044445, Written Opinion mailed Sep. 16, 2013", 9 pgs.
"Non-Access Stratum (NAS) configuration Management Object (MO)", 3GPP TS 24.368 V11.2.0. Technical Specification Group Core Network and Terminals. Release 11., (Sep. 2012), 13 pgs.
"U.S. Appl. No. 14/124,984, Preliminary Amendment filed Dec. 9, 2013", 11 pgs.
"U.S. Appl. No. 14/126,983, Preliminary Amendment filed Dec. 17, 2013", 8 pgs.
"Evolved Universal Terrestrial Radio Access (E-UTRA); Radio Resource Control (RRC); Protocol specification", 3GPP TS 36.331 V11.5.0. Technical Specification Group Radio Access Network. Release 11., (Sep. 2013), 347 pgs.
"International Application Serial No. PCT/US2013/053428, International Search Report mailed Dec. 19, 2013", 4 pgs.
"International Application Serial No. PCT/US2013/053428, Written Opinion mailed Dec. 19, 2013", 8 pgs.
"International Application Serial No. PCT/US2013/053470, International Search Report mailed Nov. 21, 2013", 3 pgs.
"International Application Serial No. PCT/US2013/053470, Written Opinion mailed Nov. 2013", 4 pgs.
Ericson, Juniper, et al., "Device triggering procedure", 3GPP TSG-CT WG3 Meeting #69. C3-120956., [Online] retrieved from the internet: <http://v9ww.3gpp.org/ftp/tsg_ct/WG3_interworking_ex-CN3/TSGC3_69JKyoto/Docs/>, (May 21, 2012), 4 pgs.
"Evolved Universal Terrestrial Radio Access (E-UTRA) and Evolved Universal Terrestrial Radio Access Network (E-UTRAN)", 3GPP TS 36.300 v11.6.0 Technical Specification Group Radio Access Network. Release 11, (Jun. 2013), 209 pgs.
"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.
"Evolved Universal Terrestrial Radio Access (E-UTRA); User Equipment (UE) radio access capabilities", 3GPP TS 36.306 v11.3.0 Technical Specification Group Radio Access Network, Release 11, (Mar. 2013), 27 pgs.
"Evolved Universal Terrestrial Radio Access (E-UTRS) User Equipment (UE) procedures in idle mode", 3GPP TS 36.304 v11.4.0 Technical Specification Group Radio Access Network, Release 11, (Jun. 2013), 34 pgs.
"Evolved Universal Terrestrial Radio Access Network (E-UTRAN); S1 Application Protocol (S1AP)", 3GPP TS 36.413 v11.4.0 Technical Specification Group Radio Access Network, Release 11, (Jun. 2013), 274 pgs.
"General Packet Radio Service (GPRS) enhancements for Evolved Universal Terrestrial Radio Access Network (E-UTRAN) access", 3GPP TS 23.401 V12.1.0. Technical Specification Group Services and System Aspects. Release 12., (Jun. 2013), 291 pgs.
"Machine-Type and other Mobil Data Applications Communications Enhancements", 3GPP TSG SA WG2 Meeting #92, TD S2-123002; 3GPP TR 23.887 v0.1.0, Release 12, (May 2012), 16 pgs.
"Machine-Type and other Mobile Data Applications Communications Enhancemetns", 3GPP TR 23.887 v1.1.0 Technical Specification Group Services and System Aspects (Release 12), (Sep. 2013), 153 pgs.
"Mobile radio interface Layer 3 specification; Core network protocols; Stage 3", 3GPP TS 24.008 V12.2.0. Technical Specification Group Core Network and Terminals. Release 12., (Jun. 2013), 682 pgs.
"Netherlands Application No. 2011257, Search Report and Written Opinion mailed Mar. 18, 2014", 11 pgs.
"Non-Access-Stratum (NAS) protocol for Evolved Packet System (EPS); Stage 3", 3GPP TS 24.301 V12.1.0. Technical Specification Group Core Network and Terminals. Release 12., (Jun. 2013), 350 pgs.
"T5 based downlink small data transfer without establishing RRC security", CATT; 3GPP Draft: S2-122826 T5 Based Downlink Small Data Transfer Without Establishing RRC Security, 3rd Generation Partnership Project (3GPP), Mobile Competence Centre; 650, Route Des Lucioles: F-06921 Sophia-Antipolis Cedex; France deel SA Wg2, nr. Barcelona, Spain (Jul. 2012), 3 pgs.
"Transfer and update of solution of small data transfer in NAS signalling", Vodafone, [RIM ?]; 3GPP Draft; S2-123414 Rev 3112 Small Data by NAS, 3rd Generation Partnership Project (3GPP), Mobile Competence Centre; 650, Route Des Lucioles; F-06921 Sophia-Antipolis Cedex; France, (Jul. 2012), 7 pgs.

(56) References Cited

OTHER PUBLICATIONS

"Use of generic NAS transport for small data", ZTE, Intel, Interdigital; 3GPP Draft; s2-123416, 3rd Generation Partnership Project (3GPP), Mobile Competence Centre; 650, Route Des Lucioles; F-06921 Sophia-Antipolis Cedex; deel SA Wg2, nr. Barcelona, Spain, (Jul. 2012), 7 pgs.

Andreev, S., et al., "Efficient small data access for machine-type communications in LTE", 2013 IEEE International Conference on Communications (ICC), (2013), 3569-3574.

"International Application Serial No. PCT/US2013/044445, International Preliminary Report on Patentability mailed Feb. 12, 2015", 11 pgs.

"International Application Serial No. PCT/US2013/053428, International Preliminary Report on Patentability mailed Feb. 12, 2015", 10 pgs.

"International Application Serial No. PCT/US2013/053470, International Preliminary Report on Patentability mailed Feb. 12, 2015", 6 pgs.

"International Application Serial No. PCT/US2014/050147, International Search Report mailed Nov. 13, 2014", 3 pgs.

"International Application Serial No. PCT/US2014/050147, Written Opinion mailed Nov. 13, 2014", 6 pgs.

"Spanish Application Serial No. P201331208, Search Report mailed Sep. 22, 2014", 4 pgs.

"Spanish Application Serial No. P201331208, Written Opinion mailed Sep. 22, 2014", 4 pgs.

"Sweden Application Serial No. 1350931-0, Office Action mailed Dec. 29, 2014", 10 pgs.

"Taiwanese Application Serial No. 102127609, Office Action mailed Dec. 1, 2014", 15 pgs.

APPARATUS AND METHOD FOR SMALL DATA TRANSMISSION IN 3GPP-LTE SYSTEMS

CROSS-REFERENCE TO RELATED APPLICATIONS

This application claims priority under 35 U.S.C. §119(e) to U.S. Provisional Patent Application Ser. No. 61/679,627, filed Aug. 3, 2012, incorporated herein by reference in its entirety.

TECHNICAL FIELD

Embodiments pertain to wireless communications. Some embodiments pertain to wireless communications used in Long-Term Evolution (LTE) networks.

BACKGROUND ART

Machines often need to communicate with other machines with little or no human intervention. In the past, such communications were made via wire. As time went on, wireless communications began to be used. With the increased availability of mobile broadband, machine type communications (MTC) via mobile broadband is becoming more and more popular. MTC enables communications between remote machines for the exchange of information and operating commands without the need for human intervention. Exemplary uses of machine-type communications include remote sensors, e-health, remote-controlled utility meters, surveillance cameras, toll payments, production chain automation, and the like. For example, a device can monitor the operation status of another device and report the statuses to a central server; a device can read a utility meter and provide the data to a billing department for the preparation of monthly utility bills; or a device in a car can sense that the car has passed a toll booth and transmit the information to the toll taking authority for billing purposes.

The amount of data being sent in MTC applications is typically smaller in size than the data present in human-initiated communication. This small amount of data traffic is a common feature across many MTC applications. User equipment (UEs) that are used in an MTC configuration may spend most of their time in an idle state and need to wake up mainly to send or receive a small amount of data.

DESCRIPTION OF THE EMBODIMENTS

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

In the following detailed description, numerous specific details are set forth in order to provide a thorough understanding of the invention. However, it will be understood by those skilled in the art that the present invention may be practiced without these specific details. In other instances, well-known method, procedures, components, and circuits have not been described in detail so as not to obscure the present invention.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of stations" may include two or more stations.

The 3rd Generation Partnership Project (3GPP) is a collaboration agreement established in December 1998 to bring together a number of telecommunications standards bodies, known as "Organizational Partners," that currently include the Association of Radio Industries and Business (ARIB), the China Communications Standards Association (CCSA), the European Telecommunications Standards Institute (ETSI), the Alliance for Telecommunications Industry Solutions (ATIS), the Telecommunications Technology Association (TTA), and the Telecommunication Technology Committee (TTC). The establishment of 3GPP was formalized in December 1998 by the signing of the "The 3rd Generation Partnership Project Agreement."

3GPP provides globally applicable standards as Technical Specifications and Technical Reports for a 3rd Generation Mobile System based on evolved GSM core networks and radio access technologies that they support e.g., Universal Terrestrial Radio Access (UTRA) for both Frequency Division Duplex (MD) and Time Division Duplex (TDD) modes). 3GPP also provides standards for maintenance and development of the Global System for Mobile communication (GSM) as Technical Specifications and Technical Reports including evolved radio access technologies (e.g., General Packet Radio Service (GPRS) and Enhanced Data rates for GSM Evolution (EDGE)). Technical Specifications for current standards related to mobile telephony are generally available to the public from the 3GPP organization.

3GPP is currently studying the evolution of the 3G Mobile System and considers contributions (views and proposals) directed toward the evolution of the UTRA Network (UT-RAN). A set of high-level requirements was identified by 3GPP workshops including: reduced cost per bit; increased service provisioning (i.e., more services at lower cost with better quality); flexibility of use of existing and new frequency bands; simplified architecture with open interfaces; and reduced/reasonable terminal power consumption. A study on the UTRA & UTRAN Long Term Evolution (UT-RAN-LTE, also known as 3GPP-LTE and Evolved UTRAN (E-UTRA)) was started in December 2004 with the objective to develop a framework for the evolution of the 3GPP radio-access technology towards a high-data-rate, low-latency and packet-optimized radio-access technology. The study considered modifications to the radio-interface physical layer (downlink (DL) and uplink (UL)) such as means to support flexible transmission bandwidth up to 20 MHz, introduction of new transmission schemes, and advanced multi-antenna technologies.

3GPP-LTE is based on a radio-interface incorporating orthogonal frequency division multiplex (OFDM) techniques. OFDM is a digital multi-carrier modulation format that uses a large number of closely-spaced orthogonal subcarriers to carry respective user data channels. Each subcarrier is modulated with a conventional modulation scheme, such as quadrature amplitude modulation (QAM), at a (relatively) low symbol rate when compared to the radio frequency (RF) transmission rate. In practice, OFDM signals are generated using the fast Fourier transform (ITT) algorithm.

As described above, Machine Type Communication (MTC) is used for communication with user equipment (UE) without human input. Some MTC UEs might spend most of their time in RRC idle state or in an extra-low power consuming state (e.g. deep idle or optimized idle state) and will mainly wake up to send or receive a small amount of data. A more efficient method of operating the UEs would be desirable.

The following examples assume that a UE is in a not-active state but is registered to the network. For example, the UE may be in a Radio Resource Control (RRC) idle state. When the network wants to trigger the UE or has a small amount of data to convey to the UE (downlink data), the network might notify the UE through the use of a paging message or even send the small data payload directly in the paging message. In addition, another newly defined message might be used in an uplink transmission to notify RRC Connection release request indication or send the small data ACK from the UE. Small data payloads are typically 1 to 128 bytes in length. However, it should be understood that small data payloads may be larger in some instances.

Figure 1:
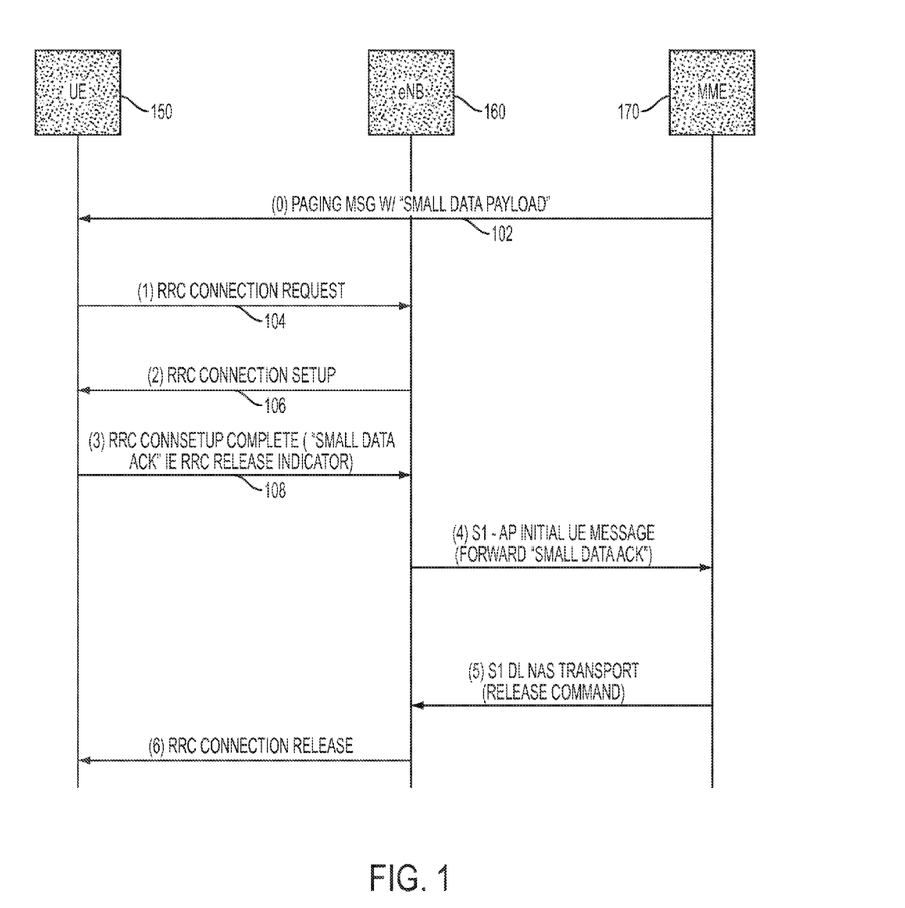
FIG. 1 is a flowchart illustrating the operation of an embodiment of the present invention.

FIG. 1 is a flowchart illustrating the use of a paging message to convey a small data payload to a UE. At the top of FIG. 1 are three entities: a user equipment (UE) 150, an evolved Node B (eNB) 160, and a Mobile Management Entity (MME) 170. The various lines shown illustrate which entity is performing a task.

MME 170 sends a paging message to UE 150. The paging message may contain a small data payload (102). After receiving this notification, UE 150 sends an RRC Connection Request message to eNB 160, requesting the establishment of a connection (104). After receiving the RRC Connection Request and assuming that the network does not reject the connection, eNB 160 replies to UE 150 with an RRC Connection Setup Complete message (106).

While sending the RRC Connection Setup Complete message to the eNB, the UE may include one of two defined information elements (IEs) (108), "Small Data ACK" and "RRC Release Indication." These two IEs may perform the following actions:

1) Small Data ACK—UE 150 acknowledges the small data reception (downlink data).

2) RRC Release Indication—If UE 150 does not have any uplink data to convey, UE 150 indicates its intention of releasing its connection because the network has already indicated that only small data was going to be sent in the downlink connection. Therefore, no other actions are expected to be coming from the network.

Thereafter, eNB 160 forwards the Small Data ACK, to MME 170 (110). MME 170 sends a release command to eNB 160 (112). eNB 160 then sends RRC Connection Release message to UE 150 to terminate the connection (114).

With continued reference to FIG. 1, the elements of FIG. 1 can be followed in another embodiment with a few changes. At (102), MME 170 sends a paging message to UE 150 with a small data payload. The paging message may indicate the need to transmit small data to UE 150. After receiving this notification, UE 150 sends an RRC Connection Request message to eNB 160 to perform connection establishment (104). After receiving the RRC Connection Request and assuming that the network does not reject the connection, eNB 160 replies to UE 150, adding the small data payload if the paging was only indicating a future transmission (106).

While sending the RRC Connection Setup Complete message to eNB 160, UE 150 may include one of two defined information elements (IEs) (108): "Small Data ACK" and "RRC Release Indicator" performing the following actions:

1) UE acknowledges the small data reception (downlink data).

2) If it does not have any uplink data to convey, the UE indicates its intention of releasing its connection because the network already indicated that only small data was going to be sent in downlink. Therefore, no other actions are expected to be coming from the network.

Thereafter, eNB 160 forwards the Small Data ACK message to MME 170 (110). MME 170 sends a release command to eNB 160 (112). eNB 160 then sends an RRC Connection Release message to UE 150 to terminate the connection (114).

In another embodiment, if network vendors prefer to have further control over the connection release of UEs, then after the transmission or reception of a small data payload (108), the "RRC Connection Release" message might be sent by eNB 160 to UE 150 as an affirmative response to the RRC Release Indication sent in the RRC Connection Setup Complete message. Thus, the remaining steps of FIG. 1 need not be performed because the connection between eNB 160 and UE 150 has been released.

In another embodiment, UE 150 could send a new RRC message to eNB 160 at (108). This message would indicate the intention of releasing the connection and simultaneously acknowledge the reception of the small data instead of acknowledging the receipt with a RRC Connection Setup Complete message. The message could be called "RRC Connection Release Request." This message might be replied to by the eNB using the existing "RRC Connection Release" message.

In another embodiment an RRC Connection Setup Complete message (described in 106) can be used to send a small data payload in an uplink connection. With continued reference to FIG. 1, at 102, UE 150 sends an RRC Connection Request to eNB 160 with a small data indicator. eNB 160 replies by sending an RRC Connection Setup message to UE 150 (104). The small data indicator is used by UE 150 to inform eNB 160 that the small data payload will be appended into the RRC Connection Setup Complete message (106). After UE 150 sends the RRC Connection Setup Complete message with the small data payload, if eNB 160 does not have any additional information to send to UE 150, eNB 160 will release UE 150 by sending an RRC Connection Release message (108). This RRC Connection Release message might also carry the acknowledgment that the small data payload was received.

In another embodiment, the RRC Connection Release message (114) may be used to send any downlink (DL) small data and acknowledgments (ACK) for uplink (UL) small data that eNB 160 has to forward to UE 150. The small data indicator may be sent via the paging message. In the alternative, eNB 160 may store the small data indicator and send it to UE 150 as part of the RRC Connection Setup Complete message.

When eNB 160 receives the first UL Network Access Stratum (NAS) message from the radio interface, eNB 160 invokes NAS Transport procedure. It sends the INITIAL UE MESSAGE message to MME 170 including the NAS message as a NAS Protocol Data Unit (NAS-PDU) Information Element (IE).

The Initial UE message format is defined in section 36.413 of the 3GPP specification. This message is sent by the eNB to transfer the initial layer 3 message to the MME over the S1 interface.

Figure 2:
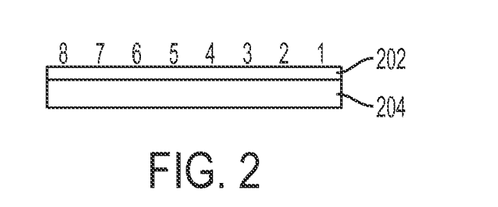
FIG. 2 shows the frame structure of an embodiment of the present invention.

The format in FIG. 2 below defines the Initial UE Message with Small Data included. The new Small Data Container (SDC) Information Element (IE) that has been defined that will carry the small data payload from eNB to MME. Modified Initial UE message is shown below:

The frame structure of the Small Data ACK IE is illustrated in FIG. 2. The Small Data ACK IEI field (202) is the identifier of the Small Data ACK IE. The size is one octet. The result field (204) indicates the success or failure of the transmission. The size is one octet.

Figure 3:
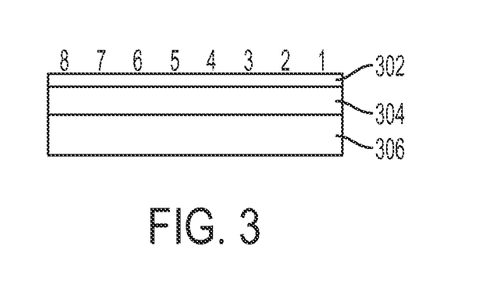
FIG. 3 shows the frame structure of an embodiment of the present invention.

The frame structure for the Small Data Container IE is shown in FIG. 3. The Small Data Container (SDC) IE is defined to send small data on NAS signaling messages, SDC IE is included as an optional IE in the 'Initial UE Message' message content. The Small Data Container IEI field (302) is the identifier of this Small Data Container IE. The size is one octet (8 bits). Length of Small Data Container field (304) is the size of the small data that would be included in this IE. The size of this field is two octets (16 bits). The Data Payload field (306)—Carries the small data payload that needs to be transmitted to/from the network. The size of this field varies from 1 to 128 octets (8 bits to 1024 bits), depending on the amount of data to be sent.

The SDC IE is a type 6 information element. A detailed explanation on the different types of information element is described in section 24.007 of the 3GPP Technical Specification.

Figure 4:
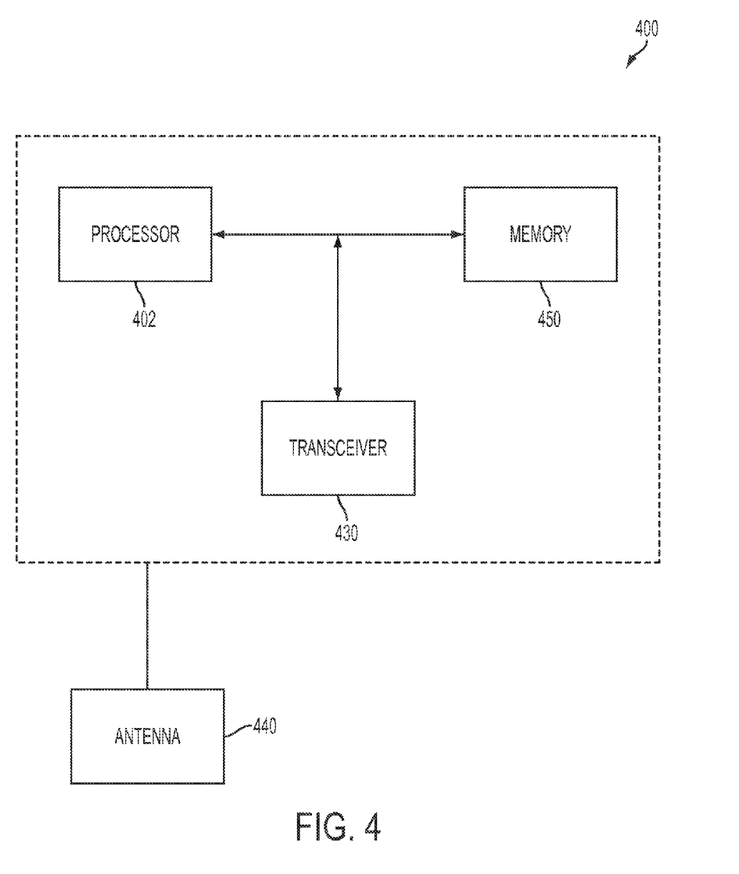
FIG. 4 shows an overview of an embodiment of the present invention.

FIG. 4 shows a block diagram of an exemplary UE that is capable of performing embodiments of the invention, A UE 400 includes a processor 402. Processor 402 is arranged to perform instructions that may be contained in a memory 450. The UE may also comprise a transceiver 430 and an antenna assembly 440. Processor 402 may be arranged to perform calculations and other operations on signals, then send those signals to transceiver 430, which prepares the signals for transmission outside the UE via antenna assembly 440. Signals from outside the UE may be received by antenna assembly 440. These signals would then proceed through transceiver 430 to processor 402 for processing. It should be understood that a UE 400 may contain other elements that are not shown in FIG. 4, such as user interface inputs (e.g., touch screens and/or buttons and outputs e.g., a displays, speakers, etc.).

There may be new information elements within various messages. It should be understood that, for ease of use, the message termed RRC Connection Release may be written without spaces: "RRCConnectionRelease." This does not change the functionality of the message.

The RRC Connection Setup Complete message may contain new information elements. In one embodiment, the RRC Connection Setup Complete message may contain several new messages, including smallDataAck, rrcRelease-Indication, and nonCriticalExtension. A SmallDataRelease message may comprise smallDataPayload and nonCriticalExtension information elements.

The RRC Connection Release message may also contain new information elements. Similarly, other messages may be referred to both with and without spaces. In one embodiment, the RRCConnectionRelease includes smallDataRelease, smallDataAck, and nonCriticalExtension information elements. The smallDataRelease information element may contain smallDataPayload and nonCriticalExtension information elements.

The RRCConnectionReleaseRequest message may also contain new information elements. In one embodiment, the RRCConnectionReleaseRequest message includes RRC-TransactionIdentifier, SmallDataRelease, and SmallDataPayload information elements.

Another new information element may be the AccessCause information element, which may be used along with the RRC-ConnectionRequest message.

The following examples pertain to further embodiments.

In one embodiment, user equipment (UE) may comprise: a processor arranged to: receive a request to send a small data payload to the UE; send a Radio Resource Control (RRC) Connection Request message to an evolved Node B (eNB); receive an RRC Connection Setup message from the eNB; send an RRC Connection Setup Complete message to the eNB; and receive an RRC Connection Release message from the eNB. The RRC Connection Setup message comprises a small data payload; and the RRC Connection Setup Complete message comprises a Small Data ACK message arranged to indicate the receipt of the small data payload.

The UE may be arranged to perform Machine Type Communications (MTC).

In one embodiment, the request to send a small data payload to the UE comprises the small data payload.

In one embodiment, the request to send a small data payload to the UE comprises a Small Data Indicator arranged to inform the UE of the need to receive a Small Data payload.

In one embodiment, the small data payload comprises data less than or equal to 128 octets in length.

In one embodiment, the UE is further arranged to receive an RRC Connection Release message. In one embodiment, the RRC Connection Release message is received from an eNB.

In one embodiment, the RRC Connection Release Request message comprises a Small Data ACK message arranged to indicate the receipt of the small data payload.

In one embodiment, the RRC Connection Request message comprises a small data indicator arranged to indicate that the UE has a second small data payload to send to the eNB; and the RRC Connection Setup Complete message comprises the second small data payload.

In one embodiment, the RRC Connection Setup message comprises an indicator arranged to indicate the presence of a small data payload; and the RRC Connection Release message comprises the small data payload.

In another embodiment, a method for sending a small data payload to a user equipment (UE) may comprise: sending a paging message to the UE; receiving a Radio Resource Control (RRC) Connection Request message; sending an RRC Connection Setup message to the UE; receiving an RRC Connection Setup Complete message; and sending an RRC Connection Release message; wherein: the paging message comprises a small data payload; and the RRC Connection Setup Complete message comprises a Small Data ACK message arranged to indicate the receipt of the small data payload.

In one embodiment, the paging message comprises a small data indictor; and the RRC Connection Setup message comprises a small data payload.

In one embodiment, the RRC Connection Request message may comprise an indication that the UE wishes to send an uplink small data payload; the RRC Connection Setup Complete message comprises the uplink small data payload;

and the RRC Connection Release message comprises an acknowledgement of the receipt of the uplink small data payload.

In one embodiment, the small data payload may comprise data less than or equal to 128 octets.

In one embodiment, the small data payload may comprise a small data container information element (IE) comprising: a small data container information element identifier field; a field arranged to indicate the length of the small data container; and a payload field arranged to contain the small data payload.

In one embodiment, the small data container information element identifier field has a length of 1 octet; the field arranged to indicate the length of the small data container has a length of 2 octets; and the payload field has a length that is between 1 octet and 128 octets.

In one embodiment, the Small Data ACK message comprises a Small Data ACK information element comprising: a Small Data ACK identifier field with a length of 1 octet; and a Result field with a length of 1 octet.

In another embodiment, a method for sending a small data payload to a UE may comprise: sending a paging message to the UE; receiving an RRC Connection Request message; sending an RRC Connection Setup message to the UE; receiving an RRC Connection Setup Complete message; and sending an RRC Connection Release message; wherein: the RRC Connection Release Request message comprises a Small Data ACK message arranged to indicate the receipt of the small data payload.

In another embodiment, a method for a UE to receive a small data payload may comprise: receiving a paging message from an MME; sending an RRC Connection Request message to an eNB; and after receiving an RRC Connection Setup message from the eNB, sending an RRC Connection Setup Complete message to the eNB. The RRC Connection Setup Complete Message may comprise a small data payload.

In one embodiment, the RRC Connection Setup Complete message may further comprise an indication that the UE has received the small data payload.

In one embodiment, the RRC Connection Setup Complete message may further comprises a request to release a connection between the UE and the eNB.

In one embodiment, the UE may also send an RRC Connection Release Request message to the eNB after sending the RRC Connection Setup Complete message.

In one embodiment, the UE may also release a connection between the UE and the eNB after receiving an RRC Connection Release message from the eNB.

In one embodiment, the RRC Connection Release message may comprise a small data payload.

While certain features of the invention have been illustrated and described herein, many modifications, substitutions, changes, and equivalents may occur to those skilled in the art. It is, therefore, to be understood that the appended claims are intended to cover all such modifications and changes as fall within the scope of the invention.

We claim:

1. A user equipment (UE) comprising:
   a processor; and
   a transceiver; wherein the processor is arranged to:
     receive a request to send a small data payload to the UE from the transceiver;
     instruct the transceiver to send a Radio Resource Control (RRC) Connection Request message to an evolved Node B (eNB) to establish a connection, wherein the RRC Connection Request message comprises a small data indicator arranged to indicate that the UE has a second small data payload to send to the eNB;
     receive an RRC Connection Setup message from the eNB from the transceiver;
     instruct the transceiver to send an RRC Connection Setup Complete message to the eNB; and
     receive an RRC Connection Release message from the eNB the transceiver; wherein:
       the RRC Connection Setup message comprises the small data payload;
       the RRC Connection Setup Complete message comprises a Small Data Acknowledgment (ACK) message arranged to indicate the receipt of the small data payload, and wherein the RRC Connection Setup Complete message comprises the second small data payload;
     wherein the RRC Connection Setup Complete message further includes a connection release indicator when the UE determines that the UE shall not transmit on the uplink for the connection.

2. The UE of claim 1 wherein the UE is arranged to perform Machine Type Communications (MTC).

3. The UE of claim 1 wherein the request to send a small data payload to the UE comprises the small data payload.

4. The UE of claim 1 wherein the request to send a small data payload to the UE comprises a Small Data Indicator arranged to inform the UE of the need to receive a Small Data payload.

5. The UE of claim 1 wherein the small data payload comprises data less than or equal to 128 octets in length.

6. The UE of claim 1 wherein the UE is further arranged to receive an RRC Connection Release message.

7. The UE of claim 6 wherein the RRC Connection Release message is received from an eNB.

8. The UE of claim 1 wherein:
   the RRC Connection Setup message comprises an indicator arranged to indicate the presence of a small data payload; and
   the RRC Connection Release message comprises an acknowledgement that the small data payload was received.

9. The UE of claim 1 further comprising an antenna assembly coupled to the transceiver wherein the transceiver is configured to transmit and receive signals using the antenna assembly.

10. A method for sending a small data payload to a user equipment (UE) comprising:
    sending a paging message to the UE;
    receiving a Radio Resource Control (RRC) Connection Request message from the UE, wherein the RRC Connection Request message comprises an indication that the UE wishes to send an uplink small data payload;
    sending an RRC Connection Setup message to the UE;
    receiving an RRC Connection Setup Complete message from the UE; and
    sending an RRC Connection Release message to the UE; wherein:
      the paging message comprises a small data payload;
      the RRC Connection Setup Complete message comprises a Small Data Acknowledgement (ACK) message arranged to indicate the receipt of the small data payload and the RRC Connection Setup Complete message comprises the uplink small data payload;
    wherein the RRC Connection Setup Complete message further includes a connection release indicator when the UE determines that the UE shall not transmit on the uplink for the connection, and wherein the RRC Connection Release message comprises an acknowledgement of the receipt of the uplink small data payload.

11. The method of claim 10 wherein:
the paging message comprises a small data indictor; and
the RRC Connection Setup message comprises a small data payload.

12. The method of claim 10 wherein the small data payload comprises data less than or equal to 128 bytes.

13. The method of claim 10 wherein the small data payload comprises a small data container information element (IE) comprising:
a small data container information element identifier field;
a field arranged to indicate the length of the small data container; and
a payload field arranged to contain the small data payload.

14. The method of claim 13 wherein:
the small data container information element identifier field has a length of 1 octet;
the field arranged to indicate the length of the small data container has a length of 2 octets
the payload field has a length that is between 1 octet and 128 octets.

15. The method of claim 10 wherein the Small Data ACK message comprises a Small Data ACK information element comprising:
a Small Data ACK identifier field with a length of 1 octet; and
a Result field with a length of 1 octet.

16. A method for a user equipment (UE) to receive a small data payload comprising:
receiving a paging message from a mobile management entity (MME);
sending an RRC Connection Request message to an evolved Node B (eNB), wherein the RRC Connection Request message comprises a small data indicator arranged to indicate that the UE has a second small data payload to send to the eNB; and
after receiving an RRC Connection Setup message from the eNB, sending an RRC Connection Setup Complete message to the eNB, wherein the RRC Connection Setup message comprises the small data payload;
wherein the RRC Connection Setup Complete Message comprises the second small data payload and a Small Data Acknowledgment (ACK) message arranged to indicate the receipt of the small data payload, and wherein the RRC Connection Setup Complete message further includes a connection release indicator when the UE determines that the UE shall not transmit on the uplink for the connection.

17. The method of claim 16 wherein the RRC Connection Setup Complete message further comprises an request to release a connection between the UE and the eNB.

18. The method of claim 16 further comprising:
releasing a connection between the UE and the eNB after receiving an RRC Connection Release message from the eNB.

19. A user equipment (UE) comprising:
a processor; and
a transceiver; wherein the processor is arranged to:
receive a request to send a small data payload to the UE from the transceiver;
instruct the transceiver to send a Radio Resource Control (RRC) Connection Request message to an evolved Node B (eNB) to establish a connection;
receive an RRC Connection Setup message from the eNB from the transceiver;
instruct the transceiver to send an RRC Connection Setup Complete message to the eNB;
receive an RRC Connection Release message from the eNB the transceiver; and
instruct the transceiver to transmit an RRC Connection Release Request message to indicate the receipt of the small data payload;
wherein:
the RRC Connection Setup message comprises the small data payload; and
the RRC Connection Setup Complete message further includes a connection release indicator when the UE determines that the UE shall not transmit on the uplink for the connection.

* * * * *

UNITED STATES PATENT AND TRADEMARK OFFICE
CERTIFICATE OF CORRECTION

PATENT NO. : 9,100,160 B2
APPLICATION NO. : 13/790630
DATED : August 4, 2015
INVENTOR(S) : Martinez Tarradell et al.

It is certified that error appears in the above-identified patent and that said Letters Patent is hereby corrected as shown below:

Title page

Item (57), in "Abstract", in column 2, line 8, delete "RAC" and insert --RRC--, therefor Item (57), in "Abstract", in column 2, line 9, delete "indicator" and insert --Indicator--, therefor On page 2, in column 1, item (56) under "Foreign Patent Documents", line 3, delete "102012007044" and insert --1020120070444--, therefor On page 2, in column 2, item (56) under "Other Publications", line 49, delete "Enhancemetns"," and insert --Enhancements",-- therefor Signed and Sealed this
Twenty-first Day of June, 2016

Michelle K. Lee
*Director of the United States Patent and Trademark Office*